United States Patent
Fujikawa et al.

(10) Patent No.: US 7,095,367 B2
(45) Date of Patent: Aug. 22, 2006

(54) NETWORK SYSTEM FOR ONBOARD EQUIPMENT

(75) Inventors: Takumi Fujikawa, Nishinomiya (JP); Yoshinari Yoshida, Nishinomiya (JP); Eiji Matsui, Nishinomiya (JP); Motoji Kondo, Nishinomiya (JP); Takumi Kawamoto, Nishinomiya (JP); Ryoichi Nakai, Nishinomiya (JP); Takeshi Yamaguchi, Nishinomiya (JP); Hiroshi Nagano, Nishinomiya (JP); Hidetoshi Kaida, Nishinomiya (JP); Masaru Nishida, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 0 days.

(21) Appl. No.: 10/128,235

(22) Filed: Apr. 24, 2002

(65) Prior Publication Data

US 2002/0161511 A1 Oct. 31, 2002

(30) Foreign Application Priority Data

Apr. 27, 2001 (JP) .............................. 2001-132345

(51) Int. Cl.
*G01S 13/00* (2006.01)
*G01S 1/00* (2006.01)
*G01C 21/26* (2006.01)

(52) U.S. Cl. ............ 342/176; 342/357.01; 342/357.06; 342/357.1; 701/200

(58) Field of Classification Search .................. 342/37, 342/46, 70–72, 90, 176, 357.01, 357.04, 342/357.06, 357.09, 357.1; 701/24, 200, 701/207, 211, 213
See application file for complete search history.

(56) References Cited

U.S. PATENT DOCUMENTS

| 4,630,048 | A | | 12/1986 | Callahan, Jr. |
| 5,583,506 | A | | 12/1996 | Sinor et al. |
| 5,917,405 | A | * | 6/1999 | Joao ............................ 340/426 |
| 5,923,285 | A | | 7/1999 | Andrusiak et al. |
| 6,384,776 | B1 | * | 5/2002 | Martin ................... 342/357.09 |
| 2002/0019831 | A1 | * | 2/2002 | Wade .......................... 707/500 |
| 2002/0169541 | A1 | * | 11/2002 | Bouve et al. ................ 701/200 |
| 2002/0178083 | A1 | * | 11/2002 | Cianciarulo et al. ........... 705/26 |
| 2002/0198632 | A1 | * | 12/2002 | Breed et al. .................... 701/1 |

FOREIGN PATENT DOCUMENTS

| FR | 2791778 A | 10/2000 |
| GB | 2344713 A | 6/2000 |

* cited by examiner

*Primary Examiner*—Thomas H. Tarcza
*Assistant Examiner*—Isam Alsomiri
(74) *Attorney, Agent, or Firm*—Birch Stewart Kolasch & Birch, LLP

(57) ABSTRACT

An onboard equipment network system comprises a radar core device, a GPS core device, an echo sounder core device and a sonar core device and display devices which are connected to a network through a hub. Each core device includes a detecting section or a positioning section, as well as a control section, a power supply section and a data transmitter for transmitting detecting signals or positioning signals, while each display device includes a command section for transmitting command data to the individual core devices for setting their operating conditions and a display section for displaying image data received from the individual core devices. The command data is transmitted using Transmission Control Protocol (TCP) while the image data is transmitted using User Datagram Protocol (UDP).

4 Claims, 14 Drawing Sheets

△ : Last Sample Points

FIG. 10

| Address | Data Contents |
|---|---|
| 0 | 3.　　　(Number Of Sweep Lines Per One Transmission of Transmit Data) |
| 1 | 256　　　(Number Of Dots Per Sweep Line) |
| 2 | ① Relative Antenna Direction Data And Updata Sample Value Presence Data For The First Sweep |
| 3 | Update Position Data |
| ⁓ | |
| i | Update Position Data |
| j | Update Sample Value |
| ⁓ | |
| m | Update Sample Value |
| n | ② Relative Antenna Direction Data And Update Sample Value Presence Data For The Second Sweep |
| o | ③ Relative Antenna Direction Data And Update Sample Value Presence Data For The Third Sweep |
| p | Update Position Data |
| ⁓ | |
| s | Update Position Data |
| t | Update Sample Value |
| ⁓ | |

NETWORK SYSTEM FOR ONBOARD EQUIPMENT

BACKGROUND OF THE INVENTION AND RELATED ART STATEMENT

1. Field of the Invention

The present invention relates to an onboard equipment network system including at least one detecting apparatus, such as a radar, a sonar or an echo sounder, and/or a positioning apparatus, such as a receiver for the Global Positioning System (GPS receiver), and a common display device, wherein image data obtained by the detecting apparatus and/or the positioning apparatus is transmitted through a network and displayed on the display device.

2. Description of the Background Art

Conventionally, it is necessary for such onboard equipment as a radar, a sonar, an echo sounder or a GPS receiver to uninterruptedly monitor situations surrounding a vehicle or target situations. Specifically, they need to continuously, or continually, receive incoming signals and produce detection data or positioning data. Accordingly, this kind of onboard equipment has to handle an enormous amount of received data, which is different from ordinary image data or command data, and for transmitting the received data to a display device for on-screen display, the provision of a data transmission line having a large transmission capacity is essential.

A detecting apparatus like a radar or a sonar converts received echo signals which are originally formatted for a polar coordinate system into signals for a Cartesian coordinate system and displays an image of received echoes on a raster-scan display. A graphical representation of the received echo signals reveals that these signals are densely arranged near the sweep origin and become progressively sparser outward as can be seen from FIG. 14, which represents the geometric arrangement of the received signals. Thus, when the received signals are converted into the signals formatted for the Cartesian coordinate system for raster scan, each pixel close to the sweep origin contains data derived from a larger number of echo signals than a pixel located away from the sweep origin. In other words, pixels close to the sweep origin correspond to large numbers of echo signals. Therefore, if the echo signals are to be handled in their original form, or in the polar coordinate system, an enormous amount of data would occur on the pixels close to the sweep origin. While each of the aforementioned detecting apparatus transmits data reformatted for the Cartesian coordinate system to their display device to solve the problem related to data transmission capacity, the amount of data is still considerably great compared to ordinary command data, for example, because the signals are received uninterruptedly.

To properly handle such enormous amounts of data without being adversely affected by external influences, a data transmission line having a large transmission capacity is employed to interconnect a core device of the aforementioned conventional detecting or positioning apparatus which receives detection signals or positioning signals and generates image data and a display device which displays the image data. In addition, the core device and the display device are positioned as close as possible to each other and they are normally enclosed in a single housing.

As a result of recent years' advances in communications technology, it has become possible to exchange data to and from individual apparatus through a communications network (e.g., local area network, or LAN) and selectively display desired data or simultaneously display the data of individual apparatus. It has also become possible to display the data or images on a monitor which is commercially available on the market.

It is however necessary for the aforementioned onboard equipment to uninterruptedly receive the detection or positioning signals, convert these signals into appropriate image data and display images on a display. Therefore, even if the received signals are reformatted into the signals for the Cartesian coordinate system as stated above and the resultant data are transmitted pixel by pixel, the amount of data to be transmitted from the core device of each apparatus is so enormous that it is often impossible to use a generally available communications network like the LAN for presentation on a common monitor due to limitations in the transmission capacity, for example.

In a case where the core device and the display device of each of the detecting and/or positioning apparatus are housed in a single housing, the individual detecting apparatus and/or positioning apparatus (e.g., GPS receiver) work as stand-alone systems, making it difficult to share their respective data. To make it possible to monitor and use the data of other apparatus, it is necessary to connect the individual apparatus by cables or other data transmission means, which requires additional expenses and installation space.

If the positioning data obtained by a GPS receiver is to be displayed on the display device of a radar, for example, there arises a problem that the display device of the GPS receiver becomes unnecessary.

Also, if the core devices of the individual detecting and/or positioning apparatus are simply connected to a network, there can arise a case where a common display device on the network is off while the individual core devices are on. In this case, it is impossible to display any data on the display device no matter whether the core devices are receiving and processing signals, resulting in a waste of electric power.

SUMMARY OF THE INVENTION

In view of the foregoing, it is an object of the invention to provide an onboard equipment network system in which a plurality of detecting apparatus, such as a radar, and/or positioning apparatus, such as a GPS receiver, are connected to a common display device by a network, allowing exchange of data between these detecting and/or positioning apparatus and the display device, wherein core devices of the individual apparatus and the display device are individually enclosed in their own housings.

It is another object of the invention to provide an onboard equipment network system which enables easy exchange of data without deterioration in the quality of images.

It is still another object of the invention to provide an onboard equipment network system which makes it possible to turn on and off and otherwise control core devices of individual detecting and/or positioning apparatus from a common display device connected to the individual apparatus by a network.

According to the invention, an onboard equipment network system comprises one or more core devices each including a detecting section or a positioning section and one or more display devices each including a display section for displaying detection data or positioning data generated by any of the core devices and a command section for generating and transmitting command data for setting operating conditions of the core devices, wherein at least one each core device and display device are connected by a network so that they can exchange multiple kinds of data to each other.

The onboard equipment network system thus constructed makes it possible to remotely control the operating conditions of the core devices from the desired display device connected via the network.

Since the display device and the core device are separately enclosed in their own housings, it is possible to reduce the physical size of each device and save their installation spaces in a ship's bridge, for example.

In addition, since the display device and the core device are enclosed in their own housings, it is possible to reduce the influence of electromagnetic interference from the display device to the core device.

In one feature of the invention, the onboard equipment network system further comprises an identifier for identifying each core device and display device, and a communications protocol selector for switching data transmission format in such a manner that the command data is exchanged using a protocol which executes delivery verification between the core device and the display device and the detecting data or the positioning data is exchanged using a protocol which does not execute delivery verification between the core device and the display device.

In this construction, the command data and the detecting/positioning data can be transmitted by the protocols suited to their nature, thereby ensuring high efficiency and reliability of data transmission.

In another feature of the invention, the onboard equipment network system further comprises an identifier for identifying the core device and the display device, and a communications protocol selector for switching data transmission format in such a manner that the command data is exchanged using Transmission Control Protocol which executes delivery verification between the core device and the display device and the detecting data or the positioning data is exchanged using User Datagram Protocol which does not execute delivery verification between the core device and the display device.

This construction makes it possible to transmit the command data with ease and high reliability. Also, this construction makes it possible to broadcast, or simultaneously transmit, a large amount of detecting/positioning data to the multiple display devices at a high transmission rate.

In another feature of the invention, the onboard equipment network system is constructed such that the command data transmitted from the display device to the core device contains a power supply control command.

This construction enables the display device to turn on and off a main power supply unit of each core device independently of other core devices by sending the power supply control command to the desired core device.

In another feature of the invention, the onboard equipment network system is constructed such that the main power supply unit of each core device is turned on when it receives operation command data from all the display devices and the main power supply unit of each core device is turned off when it does not receive the operation command data from all the display devices for a specific period of time.

This construction makes it possible to automatically turn on and off the main power supply unit of each core device depending on whether each display device is powered on or off.

In another feature of the invention, the onboard equipment network system is constructed such that the main power supply unit of each core device is turned on when it receives operation command data from at least one display device and the main power supply unit of each core device is turned off when it does not receive the operation command data from any of the display devices for a specific period of time.

This construction makes it possible to automatically turn on and off the main power supply unit of each core device depending on whether each display device is powered on or off. In this construction, it is possible to display the detecting data or the positioning data if only one display device is in operation.

In another feature of the invention, the onboard equipment network system is constructed such that each core device includes a control section having a data transmitter for periodically transmitting command data to the individual display devices, wherein the main power supply unit of each core device is turned on when it receives a response signal from any of the display devices and the main power supply unit of each core device is turned off when it does not receive the response signal for a specific period of time.

This construction enables the core device to continuously monitor operating conditions of the individual display devices and manage power supply control operation of the core device itself according to the results of monitoring.

In another feature of the invention, the detecting section includes a primary memory for storing on a real-time basis sample values sampled on at least one sweep line, a reference memory for storing the individual sample values derived from the sweep line, a data buffer controller which compares the individual sample values of each new sweep line read out of the primary memory with sample values previously stored in the reference memory and, if any of the new sample values has a signal intensity differing from that of the previously stored sample value at the same distance from sweep origin on the same sweep line, causes a transmit data buffer to store update sample value presence data indicating that an update sample value is present, update position data indicating the position of the update sample value on the sweep line, sweep direction data indicating the direction of the sweep line and the update sample value at that position, and, if all of the new sample values have the same signal intensities with the previously stored sample values on the same sweep line, causes the transmit data buffer to store update sample value presence data indicating that no update sample value is present and the sweep direction data once every scan cycle for each pixel as much as a specific storage capacity, and a display data transmitter for transmitting data content of the transmit data buffer as display data to the specified display device.

This construction serves to reduce the amount of data transmitted from the core device to the display device.

In another feature of the invention, the detecting section includes a primary memory for storing on a real-time basis sample values sampled on at least one sweep line, a reference memory for storing individual sample values derived from sweep lines included in one scan cycle, a data buffer controller which compares the individual sample values of the sweep lines in each successive scan cycle read out of the primary memory with sample values of the one scan cycle previously stored in the reference memory and, only when any of the new sample values has a signal intensity differing from that of the previously stored sample value at the same distance from sweep origin, causes a transmit data buffer to store update sample value presence data indicating that an update sample value is present, update position data indicating the position of the update sample value on the sweep line, and the update sample value at that position as much as a specific storage capacity, and a display data transmitter for transmitting data content of the transmit data buffer as display data to the specified display device.

This construction serves to further reduce the amount of data transmitted from the core device to the display device.

In still another feature of the invention, the detecting section includes as means for generating the detection data a maximum sample value extractor for extracting a maximum sample value from sample values for each pixel during a period from the first access to the last access to the sample values for each pixel when sample values of individual sampling points on each successive sweep line are converted into corresponding pixel data formatted for a Cartesian coordinate system.

This construction makes it possible to make the maximum sample value an effective sample value for each pixel and thereby produce detected image data better representing multiple sample values of each pixel.

In yet another feature of the invention, the detecting section includes an average calculator for calculating an average of sample values for each pixel during a period from the first access to the last access to the sample values for each pixel when sample values of individual sampling points on each successive sweep line are converted into corresponding pixel data formatted for a Cartesian coordinate system.

This construction makes it possible to make the average sample value an effective sample value for each pixel and thereby produce detected image data better representing multiple sample values of each pixel.

In a further feature of the invention, the detecting section includes a display data transmitter for transmitting all sample values on each successive sweep line to the specified display device through the control section once per a specific number of sweeps.

This makes it possible to transmit all the sample values once per the specified number of sweeps and thereby prevent malfunction (incorrect display) of the display device due to communication errors.

These and other objects, features and advantages of the invention will become more apparent upon a reading of the following detailed description in conjunction with the accompanying drawings.

BRIEF DESCRIPTION OF THE DRAWINGS

FIG. 10 is a chart showing an example of transmit data formats employed by a transmit data buffer;

DETAILED DESCRIPTION OF THE PREFERRED EMBODIMENTS OF THE INVENTION

An onboard equipment network system according to a first embodiment of the invention is now described in detail with reference to FIGS. 1 through 13.

Figure 1:
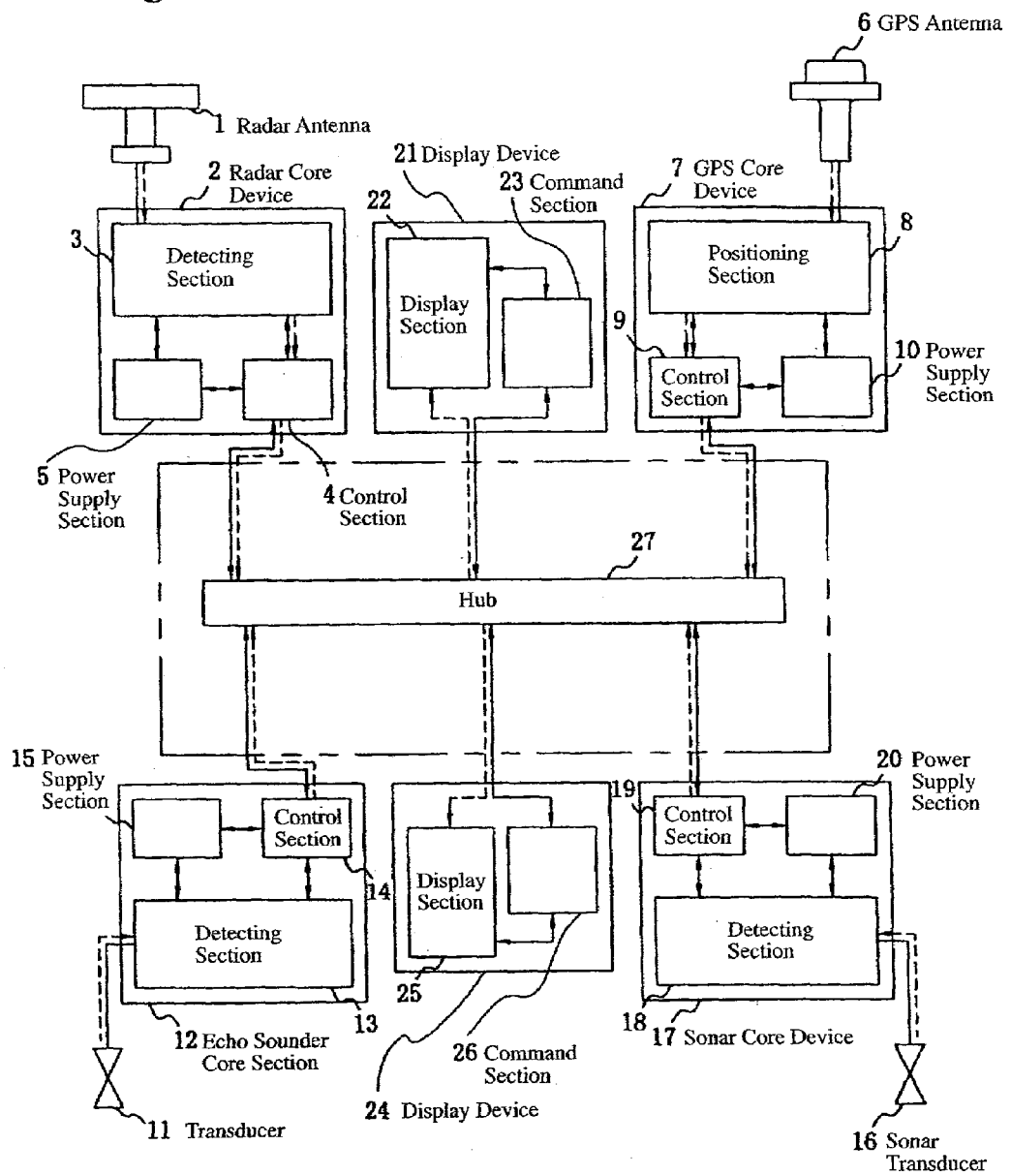
FIG. 1 is a block diagram of an onboard equipment network system according to a first embodiment of the invention.

FIG. 1 is a block diagram of the onboard equipment network system according to the first embodiment of the invention, in which solid arrows indicate command data for controlling power on/off and operating conditions of individual system elements while broken arrows indicate detection signals and positioning signals as well as such image data as detection data and positioning data for ons-creen display. As shown in FIG. 1, the onboard equipment network system comprises a radar, a GPS receiver, an echo sounder, a display device 21 and a display device 24.

The radar includes a radar antenna 1 for transmitting and receiving radio detection signals and a radar core device 2. The core device 2 includes a radar detecting section 3 which generates detection data, or radar image data, from the detection signals, a control section 4 for controlling transmission of the radar image data, operating conditions of the detecting section 3 and on/off states of a power supply section 5, and the power supply section 5 for feeding electric power to the detecting section 3 and the control section 4.

The GPS receiver includes a GPS antenna 6 for receiving positioning signals from satellites and a GPS core device 7. The GPS core device 7 includes a positioning section 8 which generates positioning data, a control section 9 for controlling data transmission and power on/off states, and a power supply section 10.

The echo sounder includes a transducer 11 for transmitting ultrasonic pulses and receiving return echoes and an echo sounder core device 12 which performs a function similar to that of the core device 2 of the radar.

Similarly, a sonar includes a sonar transducer 16 and a sonar core device 17.

The display device 21 includes a display section 22 for displaying image data received from the core devices 2, 7, 12, 17 of the individual detection and positioning apparatus and a command section 23 for setting operating conditions of the core devices 2, 7, 12, 17 of the individual detection and positioning apparatus. The display device 24 has a similar construction, including a display section 25 and a command section 26.

The aforementioned radar core device 2, GPS core device 7, echo sounder core device 12, sonar core device 17 and two display devices 21, 24 are connected to a network via a hub 27 as illustrated.

These core devices 2, 7, 12, 17 and display devices 21, 24 are individually assigned Internet Protocol (IP) addresses which are attached to data as identifiers of individual terminals (devices) on the network, enabling each terminal to transmit the data to a specified terminal (recipient).

In this network system, command data specifying operating conditions of the individual core devices 2, 7, 12, 17 are transmitted according to Transmission Control Protocol (TCP), in which each sequence of data transmission and reception is verified between a sender and a recipient. This verification process serves to ensure highly reliable delivery of the command data.

The image data including the detection data and positioning data are transmitted according to User Datagram Protocol (UDP), in which a sender (any of the core devices) simply transmits data to a recipient (either of the display devices) by a connectionless sequence.

More specifically, the sender (any of the core devices) transmits a specific amount of image data at specific intervals to a desired recipient (either of the display devices 21, 24) while accumulating the image data, wherein each piece of image data exchanged on the network is affixed with identifier data simply enabling identification of the recipient. While the recipient display devices 21, 24 display the image data on their display sections 25, 26, they do not return any message to the transmitting core device in confirmation of the receipt of the image data. Accordingly, even when a communication error occurs causing a partial imperfection of the transmitted image data, the transmitting core device does not retransmit the image data. An advantage offered by omitting the exchange of delivery verification data is high-speed transmission and reception of the image data over the network.

Since the important command data specifying the operating conditions of the individual core devices 2, 7, 12, 17 are transmitted and received with delivery verification in a reliable fashion as stated above, there is little risk of errors in their detecting or positioning operation. The data transmission rate is not so high in this connection-oriented communication method because delivery verification data is transmitted each time the command data is received from the sender. The command data do not occur so frequently, however, that transmission of the delivery verification data does not much affect the data transmission rate.

In contrast, since the image data including the detection data and positioning data occur uninterruptedly when any of the core devices 2, 7, 12, 17, the amount of data is considerably large. Therefore, if these data are transmitted using a connection-oriented protocol like the aforementioned TCP, the data transmission rate is significantly decreased, resulting in an inability to transmit the data in extreme cases.

In addition, the image data are successively transmitted in large quantities and, even if a single set or part of data is missing, it is immediately overwritten or updated by a subsequent set of data and, for this reason, temporary losses of data do not significantly affect the integrity of the entire on-screen image. It is therefore possible to broadcast, or simultaneously send, the image data to multiple display devices at a high transmission rate without much problem using UDP which does not require transmission of the delivery verification data.

The present network system runs on a software program which automatically selects one of the aforementioned communications protocols, TCP and UDP, depending on the type of data transmitted and received on the network.

This capability of automatically selecting an appropriate data transmission method depending on the type of data transmitted and received ensures efficient data transmission.

The onboard equipment network system thus constructed makes it possible to remotely control the operating conditions (e.g., range and image magnification factor) of the core devices 2, 7, 12, 17 of the individual detection and positioning apparatus on the network from either of the display devices 21, 24. A noticeable advantage of this remote control capability is that it eliminates the need for the provision of discrete means (e.g., range knob) on the individual core devices 2, 12, 17 for directly setting their operating conditions. This enables a reduction in the size of their housings.

Moreover, since the individual detection and positioning apparatus can be installed at a distance from the display devices 21, 24, it is possible to reduce the influence of electromagnetic interference produced by the display devices 21, 24, such as noise generated by high-voltage horizontal synchronizing pulses of a cathode ray tube (CRT) and backlight noise emitted from a liquid crystal display (LCD).

Power supply control operation performed in this network system is now described with reference to FIGS. 2 through 4.

Figure 2:
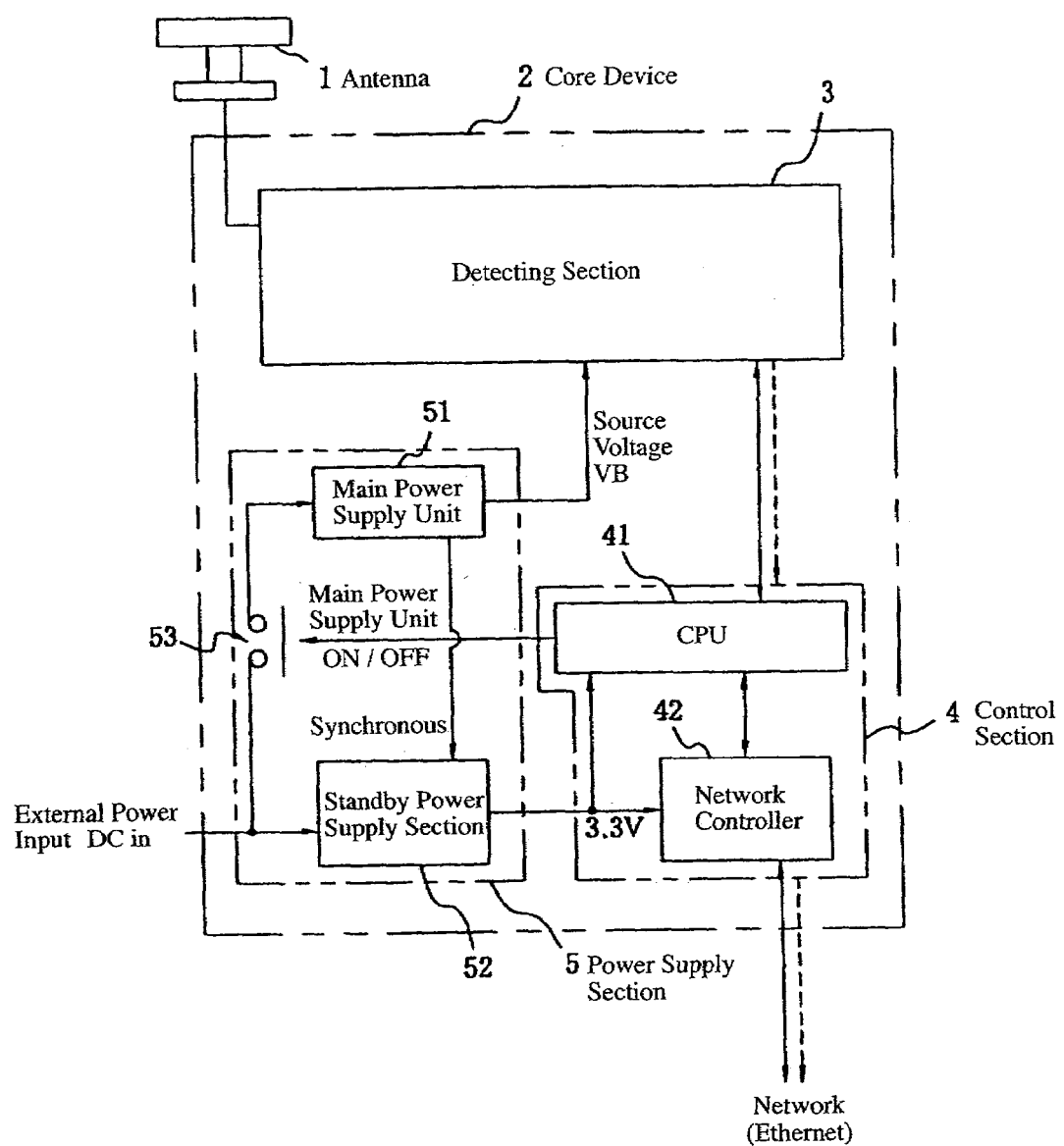
FIG. 2 is a block diagram of a radar of the onboard equipment network system according to the first embodiment.

FIG. 2 is a block diagram of the radar of the onboard equipment network system, in which designated by the numeral 1 is the aforementioned radar antenna, designated by the numeral 2 is the aforementioned core device, designated by the numeral 3 is the aforementioned detecting section, designated by the numeral 4 is the aforementioned control section, designated by the numeral 5 is the aforementioned power supply section, designated by the numeral 41 is a central processing unit (CPU), designated by the numeral 42 is a network controller, designated by the numeral 51 is a main power supply unit, designated by the numeral 52 is a standby power supply unit and designated by the numeral 53 is a main power supply switch.

The control section 4 includes the network controller 42 for controlling network communications to and from the radar and the CPU 41 for controlling communications and power supply, wherein their internal circuits are operated by a low voltage of about 3.3 V. This operating voltage is supplied from the standby power supply unit 52 which is a low-voltage power source provided in the power supply section 5 to keep the CPU 41 and the network controller 42 always in an ON state.

The detecting section 3 converts radio detection signals received by the antenna 1 into detected image data through its receiving circuits. The detected image data is transmitted to one or both of the display devices 21, 24 connected to the radar by the network for on-screen presentation via the control section 4.

The power supply section 5 includes the standby power supply unit 52 which is the low-voltage power source for supplying electric power to the control section 4 as stated above, the main power supply unit 51 which produces a source voltage VB supplied to the standby power supply unit 52 and the detecting section 3, and the main power supply switch 53 which is provided between an external power input DCin and the main power supply unit 51 and opened and closed in accordance with a signal fed from the CPU 41. The main power supply unit 51 and the standby power supply unit 52 are synchronized in operation so that their frequencies match with each other. This serves to prevent unwanted frequency components from entering into the receiving circuits of the detecting section 3 and thereby suppress electromagnetic noise.

Figure 3A:
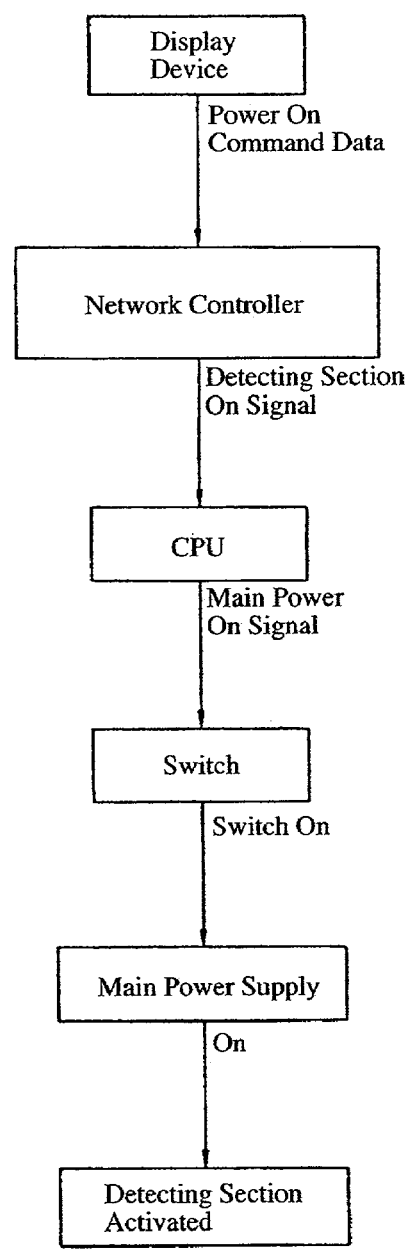
FIG. 3A and FIG. 3B are flowcharts showing startup and shutdown sequences of a detecting section, respectively.
Figure 3B:
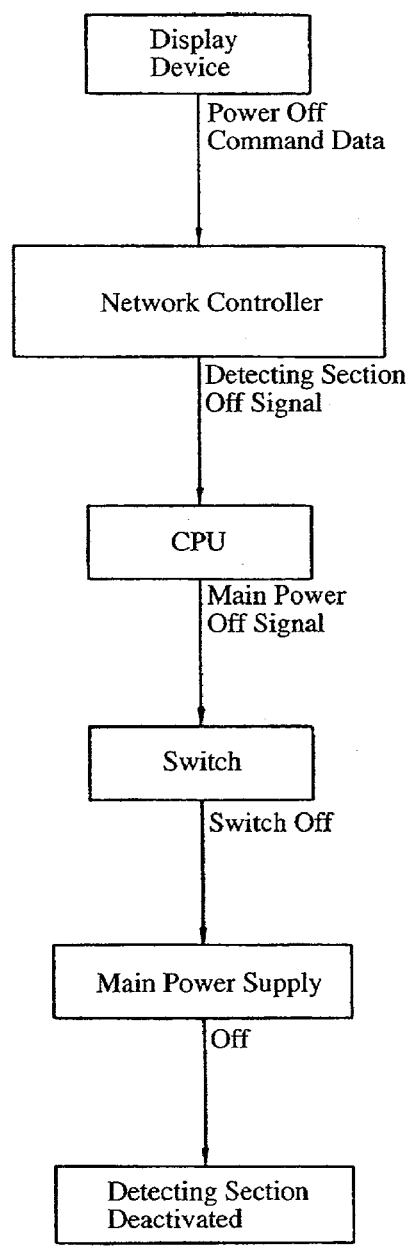

FIG. 3A is a flowchart showing a startup sequence of the detecting section 3 of the radar and FIG. 3B is a flowchart showing a shutdown sequence of the same.

The individual display devices 21, 24 generate operation command data which include command data for controlling power supply in each of the core devices 2, 7, 12, 17. This power supply control command data is sent to a desired one of the core devices 2, 7, 12, 17 whose power supply is to be controlled.

If power ON command data is sent from either of the display devices 21, 24 to the core device 2 when its detecting section 3 is inactive as shown in FIG. 3A, the network controller 42 upon receipt of the power ON command data delivers a detecting section ON signal to the CPU 41. As a consequence, the CPU 41 outputs a main power ON signal for closing the main power supply switch 53. When the main power supply switch 53 is closed, the main power supply unit 51 supplies the source voltage VB to the detecting section 3 causing it to commence detecting operation. Then, detected image data produced in the detecting section 3 is transmitted to one or both of the display devices 21, 24 connected to the radar by the network for on-screen presentation via the control section 4.

If power OFF command data is sent from either of the display devices 21, 24 to the core device 2 when its detecting section 3 is active as shown in FIG. 3B, the network controller 42 upon receipt of the power OFF command data transfers it to the CPU 41. As a consequence, the CPU 41 outputs a main power OFF signal to open the main power supply switch 53. Since the external power input DCin to the main power supply unit 51 is cut off at this point, the source voltage VB to the detecting section 3 is interrupted and the detecting section 3 stops its detecting operation.

When the detecting operation is not executed and the detected image data is not generated, the control section 4 stops to send the detected image data to the display devices 21, 24. Then, the radar core device 2 is set in standby mode, in which only the control section 4 and the standby power supply unit 52 of the power supply section 5 remain functioning while the other parts of the core device 2 are held inactive. Since only the standby power supply unit 52 supplies power to the control section 4, power consumption is considerably low in the standby mode.

The power supply for the detecting section 3 of the radar core device 2 can be controlled from either of the display devices 21, 24 connected by the network as described above.

Even if the multiple core devices 2, 7, 12, 17 and the multiple display devices 21, 24 are interconnected as in the present embodiment, it is possible to control the power supply of any of the core devices 2, 7, 12, 17 by adding the IP address specifying a desired destination (any core device) to power ON/OFF command data for controlling the power supply.

An alternative method of power supply control is now described below.

Figure 4A:
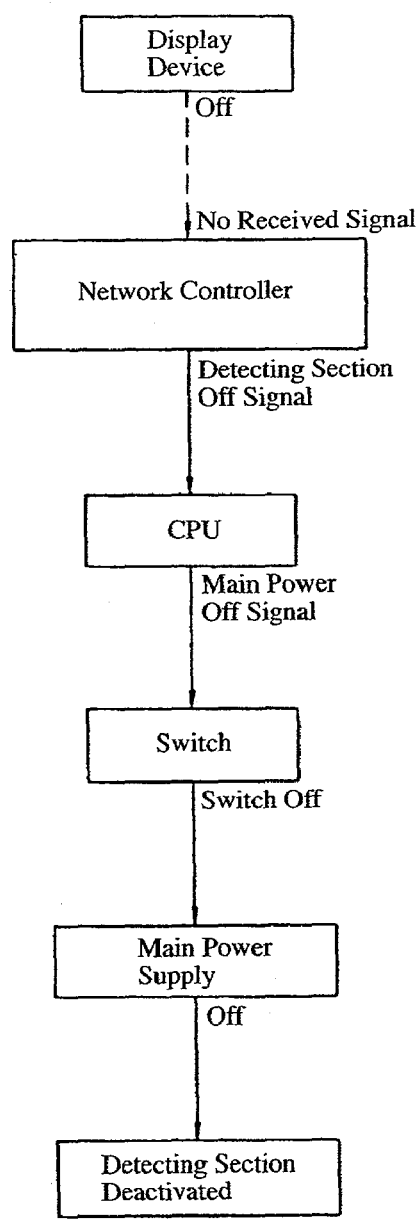
FIGS. 4A and 4B are flowcharts showing alternative shutdown and startup sequences of the detecting section, respectively.
Figure 4B:
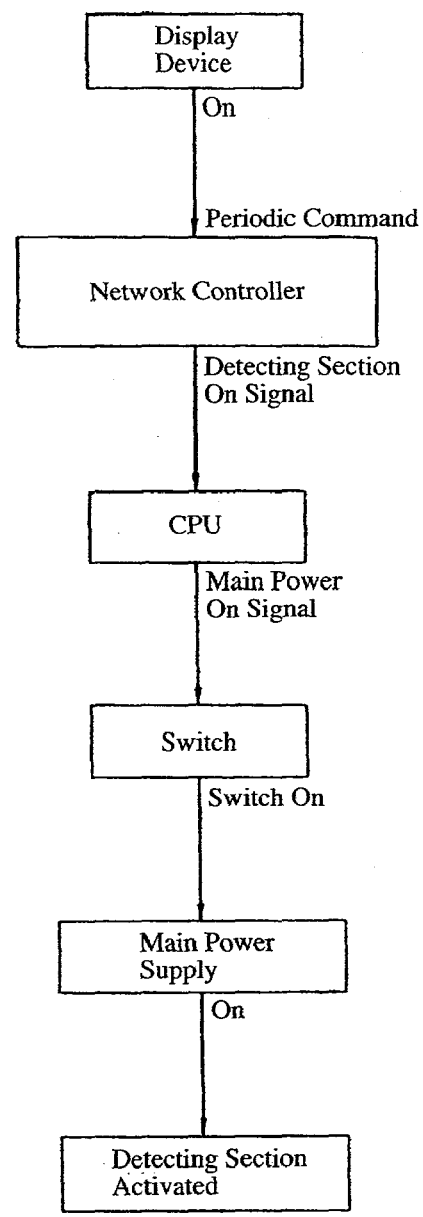

FIG. 4A is a flowchart showing a shutdown sequence of the detecting section 3 of the radar and FIG. 4B is a flowchart showing a startup sequence of the same.

Each of the display devices 21, 24 is provided with means for periodically transmitting a command to the control section 4 of the radar core device 2. This means generates periodic command data indicating that each of the display devices 21, 24 is active when they are operating, and does not generate any periodic command data when the display devices 21, 24 are not operating. Each time this command data is transmitted to the control section 4, the network controller 42 receives the command data and recognizes that the display devices 21, 24 are in operation. Then, the network controller 42 transmits a command indicating that the individual display devices 21, 24 are operating to the CPU 41, which keeps the main power supply switch 53 in an ON state.

In this power supply control method, the main power supply unit 51 is maintained in an ON state under normal operating conditions so that the detecting section 3 remains active and generates the detected image data. The detected image data thus produced is transmitted through the control section 4 to the display device 21 (24) whichever specified via the network for on-screen presentation.

When one of the display devices 21, 24 on the network, no matter which one of them, stops to generate the periodic command data as a result of power-off, for example, the control section 4 is brought to a wait state, in which the control section 4 waits for the periodic command data for a specific period of time. If the periodic command data is not received during this time-out period, the network controller 42 transmits a detecting section OFF signal to the CPU 41. Then, the CPU 41 outputs a main power OFF signal to the main power supply switch 53 to open it. When the main power supply switch 53 is opened in this fashion, the external power input DCin to the main power supply unit 51 is cut off, the source voltage VB to the detecting section 3 is interrupted and the detecting section 3 stops its detecting operation.

If the detecting section 3 does not perform the detecting operation and does not generate any detected image data, the control section 4 stops to transmit the detected image data to the specified display device 21 (24). The core device 2 is then brought to the standby mode after a specific period of time and remains idle, keeping alive only a function of waiting for the periodic command data.

When the display device 21 (24) which has been inactive resumes operation as a result of power-on, for example, the display device 21 (24) begins to transmit the periodic command data indicating that it is operating to the control section 4 of the core device 2. Upon receipt of this command data, the network controller 42 transmits a detecting section ON signal to the CPU 41. This signal causes the CPU 41 to output a main power ON signal to the main power supply switch 53 to close it.

When the main power supply unit 51 is turned on, it supplies the source voltage VB to the detecting section 3, causing it to reset the standby mode and resume normal detecting operation. As a consequence, the detecting section 3 generates the detected image data and transmits it to the display device 21 (24) whichever specified through the control section 4 and the network for on-screen presentation.

The above-described arrangement makes it possible to control the power supply of the core device 2 by using the periodic command data which is transmitted at specific intervals without any need to use a dedicated signal having multiple functions, such as power supply control command data.

Even when a network communications error occurs due to disconnection of a network cable, for example, it is possible to bring the core device 2 to the standby mode by switching off the main power because the core device 2 does not receive any signal from the display device 21 (24).

Although the core device 2 is brought to the standby mode if the periodic command data is not received from only one of the display devices 21, 24 in the aforementioned power supply control method, the method may be modified in such a manner that the CPU 41 generates a main power OFF signal to deactivate the core device 2 and bring it to the standby mode when the periodic command data is not received from both of the display devices 21, 24. In this modified power supply control method, the core device 2 resumes its detecting operation when the periodic command data is received from one of the display devices 21, 24.

This arrangement makes it possible to execute detecting operation with normally operating detecting sections and present images on the normally operating display device 21 (24) when the remaining detecting sections on the network system are not operational.

Furthermore, the aforementioned power supply control method may be modified such that each of the core devices 2, 7, 12, 17 transmits periodic command data to the individual display devices 21, 24 and the main power is switched on, causing the relevant core device to perform its detecting or positioning operation, when a response signal is received from each display device 21 (24), and that the main power is switched off, bringing the relevant core device to the standby mode, when no response signal is received from either display device 21 (24).

This arrangement enables each core device to continuously monitor operating conditions of the display devices 21, 24 and manage power supply control operation in each core device itself according to the results of monitoring.

A method of image data generation carried out by the detecting section 3 of the radar is now described with reference to FIGS. 5 through 13.

Figure 5:
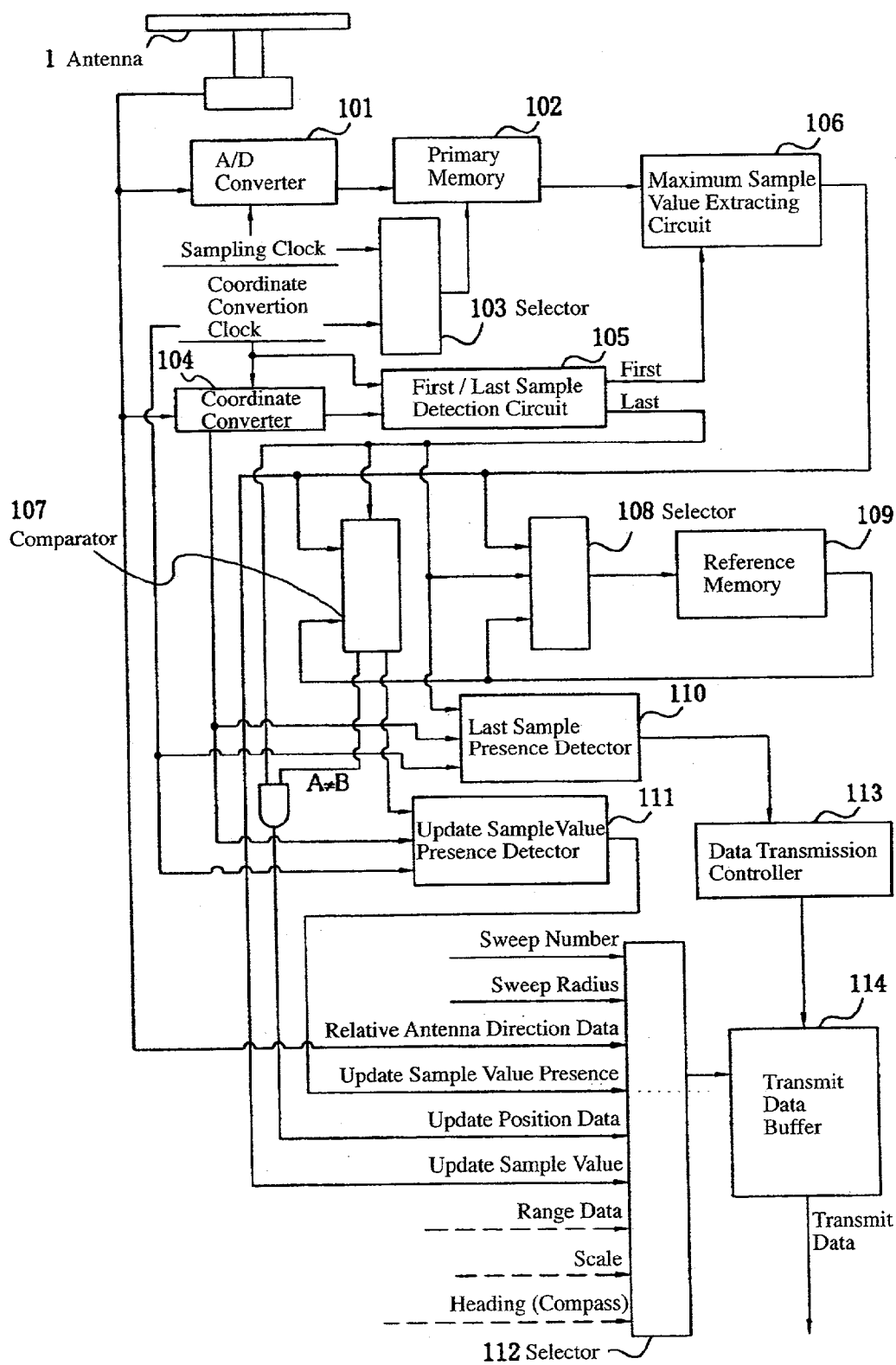
FIG. 5 is a block diagram of the detecting section of the radar particularly showing its detected image data generation circuit.

FIG. 5 is a block diagram of the detecting section 3 of the radar, in which designated by the numeral 1 is the aforementioned radar antenna, designated by the numeral 101 is an analog-to-digital (A/D) converter, designated by the numeral 102 is a primary memory, designated by the numerals 103, 108, 112 are selectors, designated by the numeral 104 is a coordinate converter, designated by the numeral 105 is a first/last sample detecting circuit, designated by the numeral 106 is a maximum sample value extracting circuit provided with an extracted data memory, designated by the numeral 107 is a comparator, designated by the numeral 109 is a reference memory, designated by the numeral 110 is a last sample presence detector, designated by the numeral 111 is an update sample value presence detector, designated by the numeral 113 is a data transmission controller, and designated by the numeral 114 is a transmit data buffer.

Analog signals received by the antenna 1 which are formatted for a polar coordinate system are converted by the A/D converter 101 into digital values and sampled at a sampling clock frequency determined in accordance with a detecting range in use. Data derived from the sampled signals of one radial sweep is stored in the primary memory 102. The primary memory 102 is provided to temporarily hold the incoming data before sending it to later stages. Otherwise, the data will overflow because the received signals are sampled at a remarkably high speed compared to the processing speed of the later stages. In other words, the primary memory 102 acts as a "time-shifting" buffer which temporarily stores the data and transfers it slightly later to match the data processing speed of the later stages.

Figure 6:
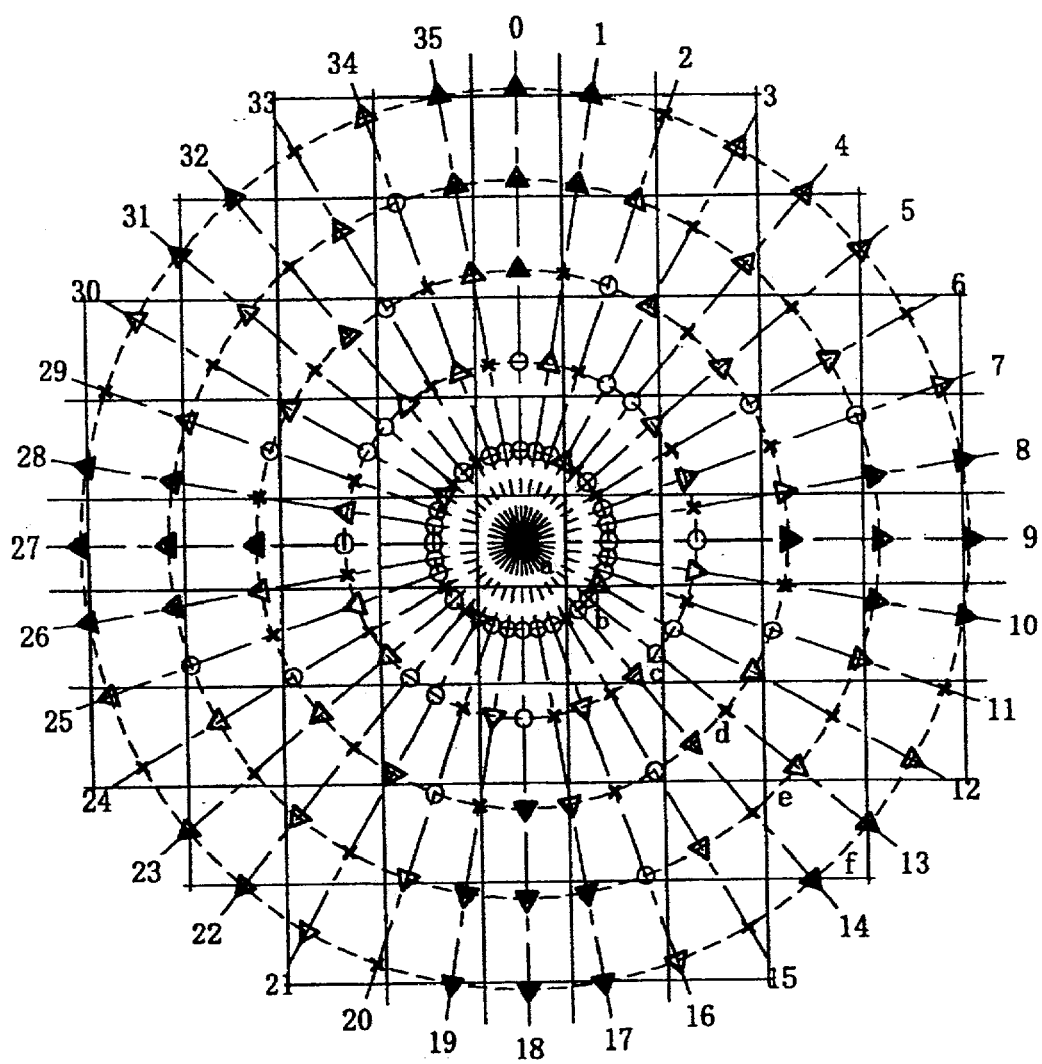
FIG. 6 is a diagram showing the relationship between received signals which are formatted for a polar coordinate system and individual pixels which are arranged on a Cartesian coordinate system.

FIG. 6 is a diagram showing the relationship between the received signals which are formatted for the polar coordinate system and individual pixels which are arranged according to a Cartesian coordinate system. Squares arranged in a grid pattern represent the individual pixels.

In FIG. 6, radial lines numbered 0 to 35 are successive sweep lines, small circles (o) represent individual sampling points, small crosses (x) represent first sample points and small triangles (Δ) represent last sample points on the individual sweep lines.

The coordinate converter 104 converts the received signals from the polar coordinate system into data formatted the Cartesian coordinate system using the following equations:

$$X = R \cdot \sin \theta$$

$$Y = R \cdot \cos \theta$$

The coordinate-converted data is then sent to the first/last sample detecting circuit 105, which identifies a sample first detected for each pixel and recognizes it as the first sample (marked x in FIG. 6) corresponding to the relevant pixel and identifies a sample last detected for each pixel and recognizes it as the last sample (marked Δ in FIG. 6) corresponding to the relevant pixel. The value of the first sample for each pixel output from the first/last sample detecting circuit 105 is transferred to the maximum sample value extracting circuit 106.

As stated above, the maximum sample value extracting circuit 106 is provided with the extracted data memory. The extracted data memory stores maximum sample values extracted by sampling individual samples corresponding to the pixels on each sweep line. If a sample corresponding to a given pixel on one sweep line received from the primary memory 102 is the first sample, the value of this sample is taken as a new sample value for that pixel. If the received sample is not the first sample for the pixel, the value of the sample is compared with a previously stored sample value for that pixel and the sample value, whichever is larger, is (re)written in the extracted data memory. This update process enables the extracted data memory to constantly hold the maximum sample values extracted for the individual pixels on each successive sweep line.

Output data of the maximum sample value extracting circuit 106 is transferred to the comparator 107, the selector 108 and the selector 112.

The comparator 107 receives the output data of the maximum sample value extracting circuit 106 as well as output data of the reference memory 109. The comparator 107 compares these two inputs and determines whether there is any difference between the two inputs each time the last sample occurs.

The output data of the maximum sample value extracting circuit 106 and the reference memory 109 are also entered to the selector 108. The selector 108 selects the output data of the maximum sample value extracting circuit 106 when the output data of the maximum sample value extracting circuit 106 is entered immediately after the last sample point of each pixel, while the selector 108 selects the output data of the reference memory 109 when the output data of the maximum sample value extracting circuit 106 is not entered immediately after the last sample point. The selector 108 outputs the data thus selected to the reference memory 109 to overwrite its data content, so that the content of the reference memory 109 is updated only when the selector 108 receives the output data of the maximum sample value extracting circuit 106 immediately after the last sample point of each pixel.

The reference memory 109 is a memory whose storage locations are assigned addresses corresponding to distances from the sweep origin (or the antenna 1). The reference memory 109 has a capacity for storing data for one sweep line that is sent from the selector 108 in a preceding stage.

Figure 7:
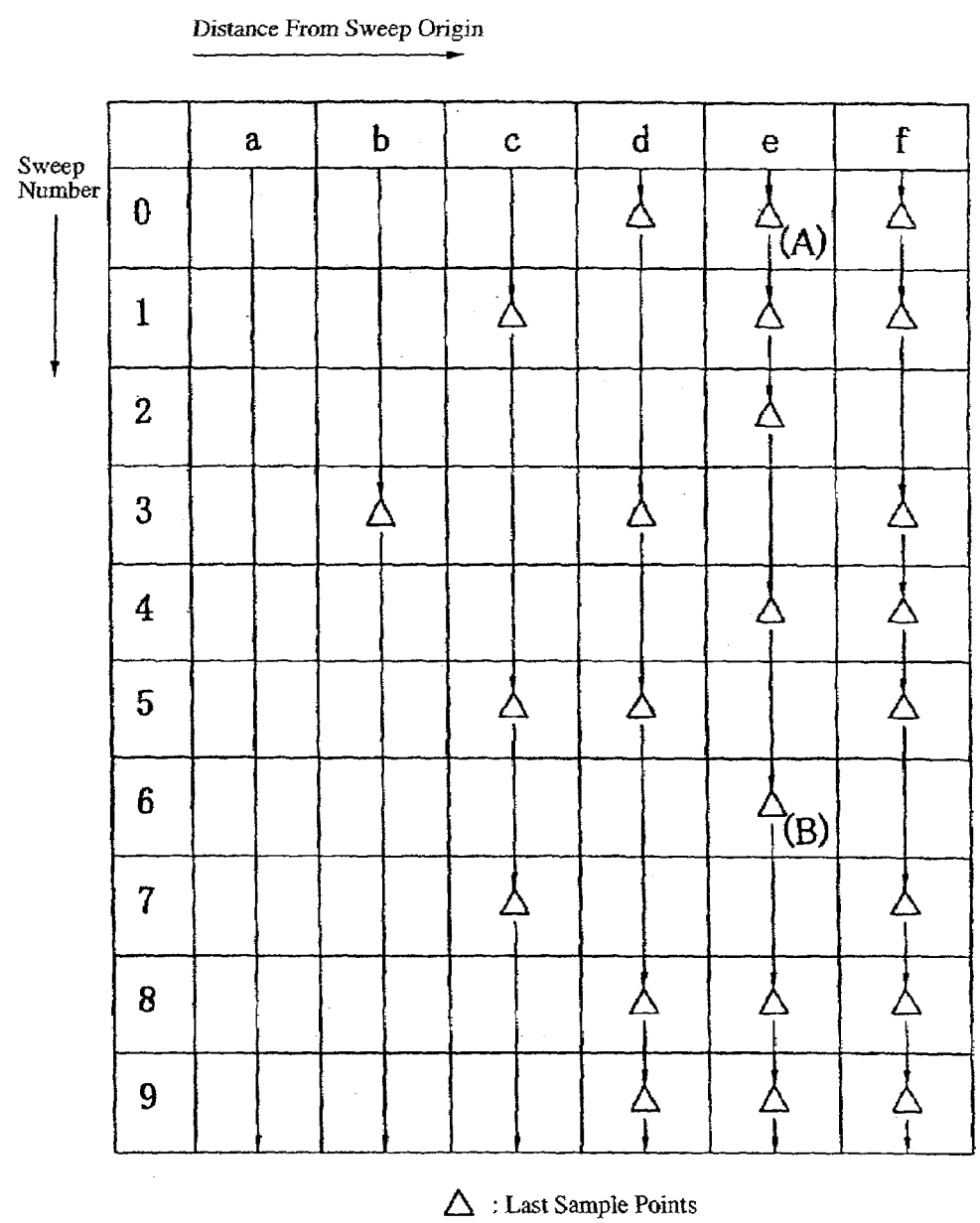
FIG. 7 is a diagram showing how data is updated within a reference memory.

FIG. 7 is a diagram showing how the data is updated within the reference memory 109.

Referring to FIG. 7, triangles (Δ) represent points where last sample points occur and the letters (A) and (B) indicate maximum sample values. Also, the letters "a" to "f" indicate sampling points corresponding to the addresses aligned according to the distance from the sweep origin and the numerals 0 to 9 indicate successive sweeps on one of sweep lines (0 to 35) shown in FIG. 6.

The reference memory 109 stores in its addresses "a" to "f" all last sample values first entered after the beginning of data transmission from the selector 108 or immediately after changing the detecting range as maximum sample values. Then, the reference memory 109 outputs its data content to the comparator 107 so that it can determine whether any subsequently occurring last sample value is equal to or different from the last sample value previously stored in each address of the reference memory 109. The comparator 107 sends its judgment result to the update sample value presence detector 111. If the new last sample value is judged to be different from the previously stored last sample value, the new last sample value is sent from the selector 108 to the reference memory 109 and stored in the corresponding address of the maximum sample value extracting circuit 106 as a new maximum sample value at the last sample point.

Let us take as an example the sampling point "e" shown in FIG. 7. On a 0th sweep, an initially occurring last sample value (A) is stored as the maximum sample value. Since the maximum sample value obtained at the sampling point "e" remains unchanged through the subsequent first to fourth sweeps, the data content of the reference memory 109 is not updated with respect to the sampling point "e". The maximum sample value obtained at the sampling point "e" becomes (B) on the sixth sweep as illustrated, so that the data content of the reference memory 109 for the sampling point "e" is updated to the value (B). The comparator 107 then uses this value (B) as the maximum sample value (or the reference value) obtained at the sampling point "e" on the preceding sweeps.

The reference memory 109 constantly holds the latest maximum sample values of the individual sampling points in the aforementioned manner.

Data thus calculated are transferred to the last sample presence detector 110 which detects the presence or absence of last sample values, the update sample value presence detector 111 which detects the presence or absence of an update sample value, and the selector 112 which attaches a specific address (addresses) to all necessary data.

A signal output from the comparator 107 is entered into the update sample value presence detector 111. The update sample value presence detector 111 judges whether the output of the maximum sample value extracting circuit 106 and the output of the reference memory 109 differ from each other. If they differ at even one sampling point on one sweep line, the update sample value presence detector 111 judges at the last sample point that there exits an update sample value. A detection signal indicating the result of this judgment is output to the selector 112.

Based on the last sample values output from the first/last sample detecting circuit 105, the last sample presence detector 110 calculates last sample value presence data and outputs it to the data transmission controller 113.

The data transmission controller 113 causes the transmit data buffer 114 to transmit accumulated information with specific timing using the last sample value presence data.

Figure 8A:
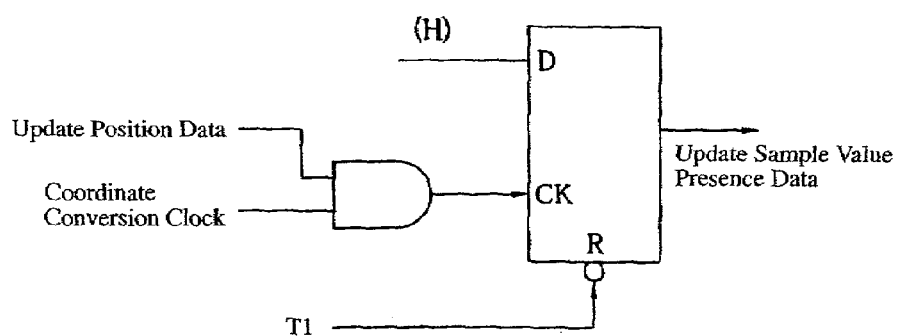
FIGS. 8A and 8B are a block diagram of an update sample value presence detector and a time chart showing its operating sequence, respectively.
Figure 8B:
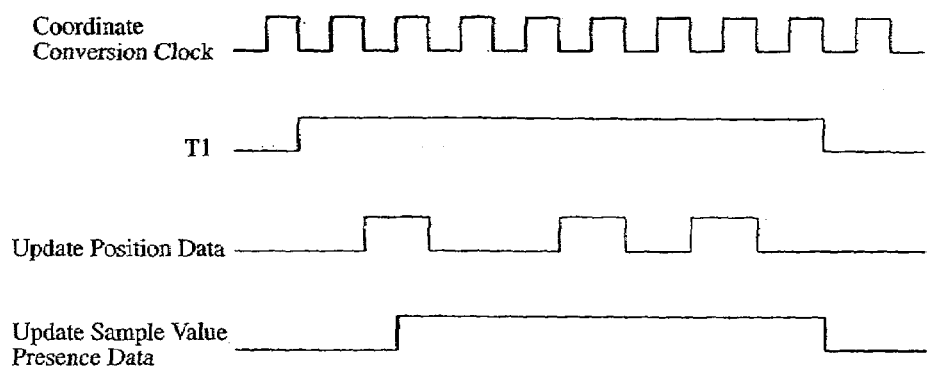

FIG. 8A is a block diagram of the update sample value presence detector 111 and FIG. 8B is a time chart showing its operating sequence.

"T1" shown in FIGS. 8A and 8B is a signal which provides a logic "1" during execution of coordinate conversion.

Referring to these Figures, if update position data is entered even once during a period when the signal T1 is set to the logic "1", the update sample value presence detector 111 outputs a logic "1" as update sample value presence data using a rising edge of a coordinate conversion clock as a trigger. This output (update sample value presence data) becomes "0" when the signal T1 is set to a "0" level. The update sample value presence detector 111 outputs the one-bit update sample value presence data which takes one of two alternative values "0" and "1" as described above.

Figure 9A:
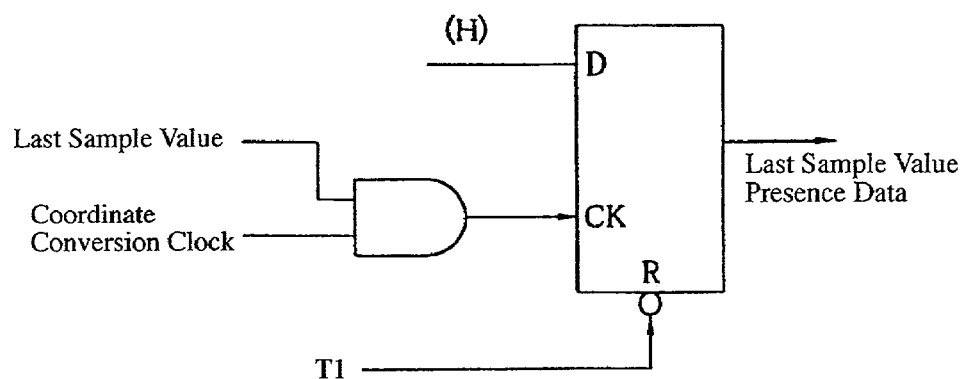
FIGS. 9A and 9B are a block diagram of a last sample presence detector and a time chart showing its operating sequence, respectively.
Figure 9B:
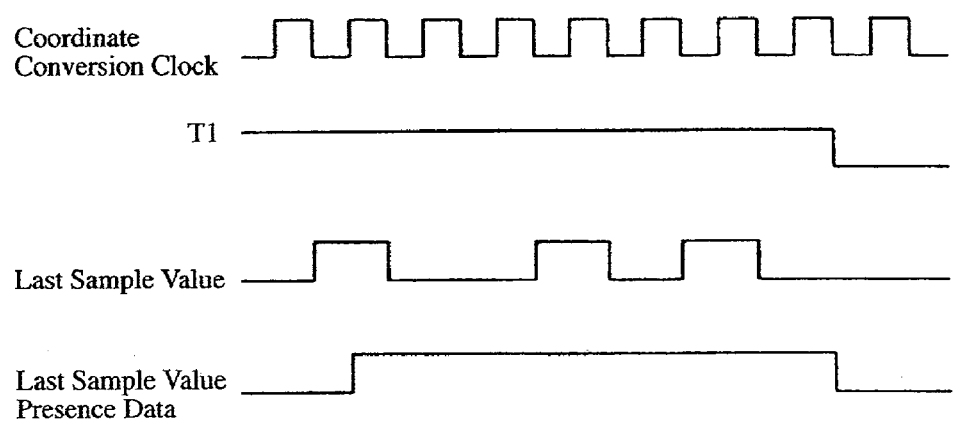

FIG. 9A is a block diagram of the last sample presence detector 110 and FIG. 9B is a time chart showing its operating sequence.

Referring to these Figures, if a last sample value is entered even once during a period when the signal T1 is set to the logic "1", the last sample presence detector 110 outputs a logic "1" as the last sample value presence data using a rising edge of the coordinate conversion clock as a trigger. This output (last sample value presence data) becomes "0" when the signal T1 is set to a "0" level. The last sample presence detector 110 outputs the one-bit last sample value presence data which takes one of two alternative values "0" and "1" as described above.

The selector 112 outputs a set of data in specific formats including sweep number data which is used for setting the number of sweep lines to be temporarily stored in the transmit data buffer 114, sweep radius data indicating the radius of each radial sweep, relative antenna direction data indicating the direction of the antenna 1 relative to the ship's heading at the time when transmit data is generated, the update sample value presence data indicating whether any update sample value is present in each sweep line, the update position data indicating the distance from the sweep origin where the update sample value exists, and update sample values differing from any existing sample values to the transmit data buffer 114.

More specifically, the aforementioned set of data is as follows.

The sweep number data indicates the total number of sweep lines contained in one transmission of the transmit data. This data is referred to by the recipient (display devices 21 and/or 24) for detecting the end of the transmit data received.

The sweep radius data indicates the length of each sweep line, or the radius, in terms of the number of dots per sweep line. If the number of dots per sweep line is 256, for example, the value of the sweep radius data is 256. This data is referred to by the recipient (display devices 21 and/or 24) for detecting the end of the update position data.

The relative antenna direction data indicates the direction of the antenna 1 relative to the ship's heading at the time of generating the transmit data. Even when any new update sample value does not occur, the relative antenna direction data is transmitted as data indicating the latest radial sweep direction whenever any last sample value occurs.

The update sample value presence data is data indicating whether any update sample value has occurred in one sweep line. This data is used for judging whether or not the update sample value is present.

The update position data is data indicating the distance from the sweep origin where the update sample value exists in terms of the number of bits from the sweep origin, wherein the total sweep line length, or the radius, is represented by a specific number of bits. To simplify the discussion, if the sweep line length is 8 bits and the update position data occurs for third, sixth and eighth addresses in terms of the distance from the sweep origin, for example, the value of the update position data is 00100101.

The update sample values are those which have newly occurred that are different from the existing sample values. This means that the update sample values are data including only those values which are to be updated.

Thus, the selector 112 transmits the same number of update sample values as the number of 1's contained in the aforementioned update position data.

The update sample value for one pixel is expressed by multiple bits representing the intensity of a received signal. If the signal is represented by 4-bits, for example, the signal intensity can be expressed as levels 0 to 15.

FIG. 10 is a chart showing an example of transmit data formats employed by the transmit data buffer 114, in which 0 to t indicate address numbers of a memory.

In this example, the value of the sweep number data, or the number of sweep lines contained in one transmission of the transmit data, is 3 and the value of the sweep radius data, or the number of dots per sweep line, is 256.

As indicated in FIG. 10, address 0 stores the sweep number data 3, which means that one transmission from the transmit data buffer 114 contains received signal data for 3 sweep lines.

Similarly, address 1 stores the value 256 as the sweep number data, which means that there are 256 dots per sweep line.

Address 2 stores relative antenna direction data and update sample value presence data for the first sweep. Since there exist update sample values for the first sweep in this example, the update position data are stored in addresses 3 to i. As the radius of sweep is represented by 256 dots, there are 256 bits of update position data. The update sample values are stored in addresses j to m for only those points where the update sample values are present, that is, where the bit value of the update position data is "1".

Address n stores relative antenna direction data and update sample value presence data for the second sweep. Since there is no update sample value for the second sweep in this example, the update position data and update sample values are not stored in the transmit data buffer 114. Although this sweep contains a last sample point, its sample value is the same as that of the preceding sweep, so that there exists no update sample value on this sweep.

Address o stores relative antenna direction data and update sample value presence data for the third sweep. Since there exist update sample values for the third sweep in this example, the update position data are stored in addresses p to s. Then, based on these update position data, the update sample values are stored in addresses t and onward for only those points where the update sample values are present, that is, where the bit value of the update position data is "1".

Since the update position data is a 1-bit signal, it is stored in the same address as the relative antenna direction data to save the storage capacity of the transmit data buffer 114 and reduce the amount of the transmit data.

While the number of bytes of the transmit data varies depending on its contents, the aforementioned transmit data formats employed in this embodiment make it possible to easily detect the end of the transmit data.

The display devices 21, 24 of this embodiment which receive the transmit data are devices having the capability to reproduce the received signals on a raster-scan screen. Provided that the display devices 21, 24 each have a sweep memory capable storing update sample values for one sweep, each display device 21 (24) updates its image memory and sweep memory when any update sample value is received, or reads previously stored data out of the sweep memory when no update sample value is received, and then displays an image on the screen. If only the relative antenna direction data is received and no update sample value is received all along one sweep, the display device 21 (24) reads out complete image data for the relevant sweep line from the sweep memory and displays the image of that sweep line on the screen. The display devices 21, 24 can exactly reproduce echo signals received by the antenna 1 in the above-described manner.

The core device 2 (sender) transmits echo data originally received in the format of the polar coordinate system and reformatted for the Cartesian coordinate system to the display device 21 (24) (recipient). Since the echo data is not transmitted more than once per antenna rotation for each pixel of the display device 21 (24) in the network system of the embodiment, the aforementioned construction serves to reduce the amount of transmitted data without causing a loss of necessary information. Although the echo data received in the format of the polar coordinate system contains larger quantities of data in the vicinity of the sweep origin, more than one sample value fits in one pixel near the sweep origin when the echo data is reformatted for the Cartesian coordinate system. Thus, each pixel near the sweep origin represents multiple sample values. This means, in other words, that the echo data is compressed around the sweep origin when displayed on the raster-scan screen of the recipient display device 21 (24) whose pixels are arranged according to the Cartesian coordinate system. The recipient display device 21 (24) eventually displays the same image regardless of whether the echo data is compressed before transmission by the sender or not. It would be appreciated from the foregoing that it is possible to reduce the amount of detected image data without causing a loss of necessary information with a simple construction using the aforementioned method.

Although sample values for one complete sweep line are needed for the first radial sweep immediately after the beginning of data transmission in the aforementioned construction, it is needed to transmit sample values for only those points where any update sample values have occurred for the second and later sweeps. This serves to improve the efficiency of data transmission to each of the display devices 21, 24.

In addition, because the position of each sampling point is specified by only the relative antenna direction data and the update position data for one sweep, it is possible to further reduce the transmit data.

It is to be noted that the number of sweep lines transmitted by one transmission of the transmit data need not necessarily be a preset number. It is possible to transmit any appropriate number of sweep lines by each transmission of the transmit data depending on the storage capacity of the transmit data buffer 114 and the amount of data generated. If there occur no update sample values on a particular sweep line, for example, the amount of data to be transmitted for that sweep line decreases. In this case, the number of sweep lines transmitted by one transmission may be increased within the limit of the storage capacity of the transmit data buffer 114. Contrary to this, if the number of update sample values is large, the number of sweep lines transmitted by one transmission may reduced. The amounts of data to be transmitted by successive transmissions from the transmit data buffer 114 can be made generally equal one another in this fashion.

Figure 11:
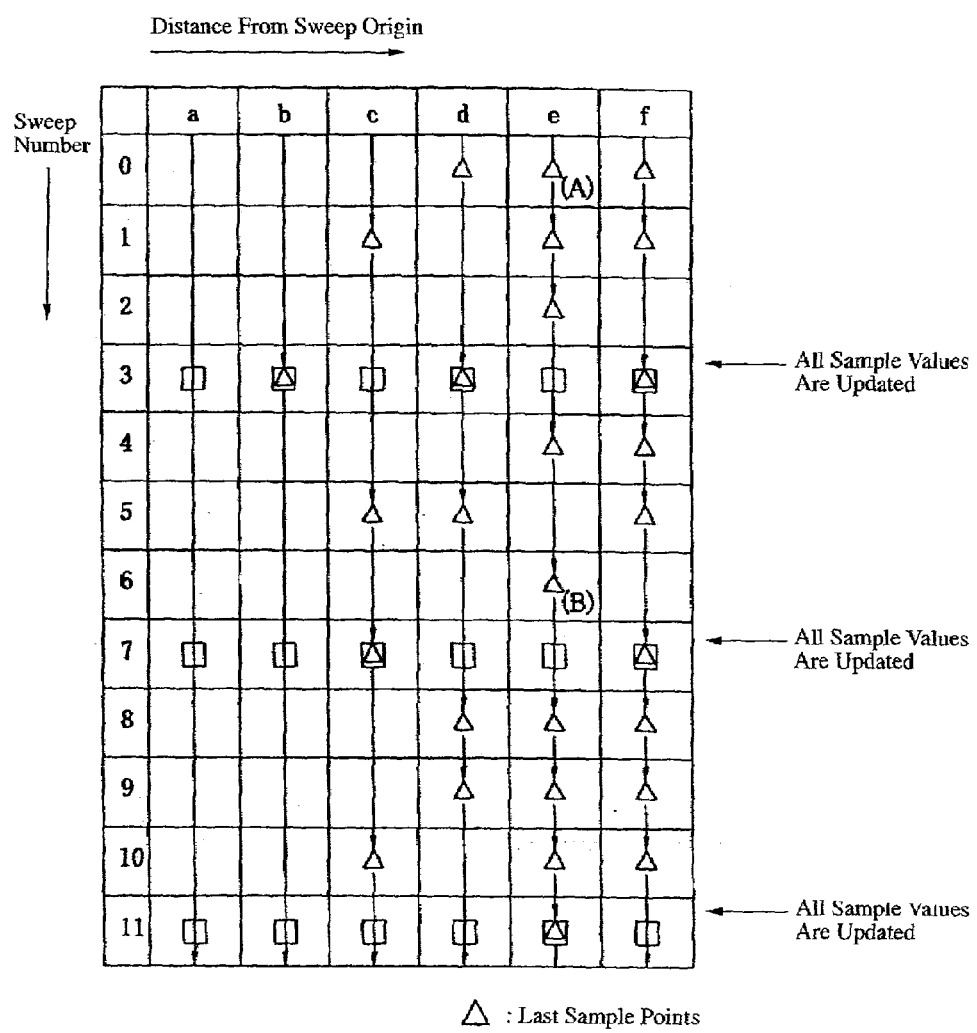
FIG. 11 is a diagram showing how signal intensity data is updated at individual distances from the sweep origin on each successive sweep.

It is also possible to prevent malfunction (incorrect display) of the recipient display device 21 (24) if sample values of all the sampling points on each radial sweep are stored at specific intervals and transmitted as part of the transmit data as shown in FIG. 11, which is a diagram showing how signal intensity data is updated at individual distances from the sweep origin on each successive sweep.

If a sample value on a new radial sweep does not differ from the previous sample value stored in the reference memory 109 when compared at the last sample point, that sample value is not transmitted to the recipient display device 21 (24) as part of the transmit data. If, however, sample values on the sixth sweep are not transmitted to the recipient display device 21 (24) due to a communication error, for example, as shown in FIG. 11, the sample value obtained at the sampling point "e" remains (A) on the recipient display device 21 (24) although the sample value in the reference memory 109 has changed to (B). If the sample value of the sampling point "e" remains (B) on the seventh and later sweeps, the sample value (B) of the sampling point "e" is not transferred and the sample value remains (A) on the recipient display device 21 (24). This causes malfunction (incorrect display, for instance) of the recipient display device 21 (24).

Under this circumstance, the sample values of all the sampling points ("a" to "f") on one sweep line are transmitted at specific intervals (every fourth antenna rotation in FIG. 11) to prevent the aforementioned problem. As the transmit data buffer 114 transmits all the sample values on the seventh sweep (antenna rotation) in the example of FIG. 11, the sample value of the sampling point "e" changes to (B) after the seventh sweep. More specifically, when signals have been received on the seventh sweep and the comparator 107 has output data, the core device 2 switches its operation to output all the sample values on the seventh sweep regardless of the timing of the last sample point of each pixel. Also, the comparator 107 outputs a signal to the update sample value presence detector 111 indicating as if all the sample values derived from the seventh sweep are update sample values and switches the operation of the update sample value presence detector 111, causing it to transfer these update sample values to the selector 112. With this signal output from the comparator 107, the sample values of all the sampling points on one sweep line are output from the maximum sample value extracting circuit 106 are treated as if they are update sample values and transmitted to the selector 112.

It is possible to prevent malfunction (incorrect display) of the recipient display device 21 (24) by transmitting the complete sample values on one sweep line at intervals of a few antenna rotations.

Furthermore, it is possible to obtain the following effects if range data indicating the range in use, scale data indicating the number of dots per range and ship's heading data (compass data) are entered to the selector 112 and transmitted to the display device 21 (24) through the transmit data buffer 114.

Since the maximum amount of data transmitted per antenna rotation is proportional to the square of the number of dots per sweep line, data transmission and reception rates could become insufficient when the antenna rotation speed is too high or when the amount of image data increases. To solve this problem, it is possible in this invention to produce the transmit data suited to the data transmission capacity of the network system by varying the distance (radial range) corresponding to one pixel which is determined by sampling clock, or by varying range and image magnification factor settings to ensure trouble-free data transmission. It is possible to reproduce the image scaled to the original range setting on the recipient display device 21 (24) by enlarging the transmitted image according to the image magnification factor.

Also, by transmitting the ship's heading data, it becomes possible to provide an azimuth-stabilized display, such as north-up presentation, on the recipient display device 21 (24) based on the relative antenna direction data.

Furthermore, if latitude/longitude data indicating the ship's current position is transmitted to the display device 21 (24), it is possible to provide a true motion display allowing direct recognition of the ship's current position.

Even if the signal intensity data derived from the individual sampling points are not maximum sample values, it is possible to construct the transmit data by using sample values first detected for the individual pixels (first sample values) or sample values last detected for the individual pixels (last sample values). This modified arrangement makes it possible to eliminate the maximum sample value extracting circuit 106 and thereby reduce the number of constituent elements of the detecting section 3.

Figure 12:
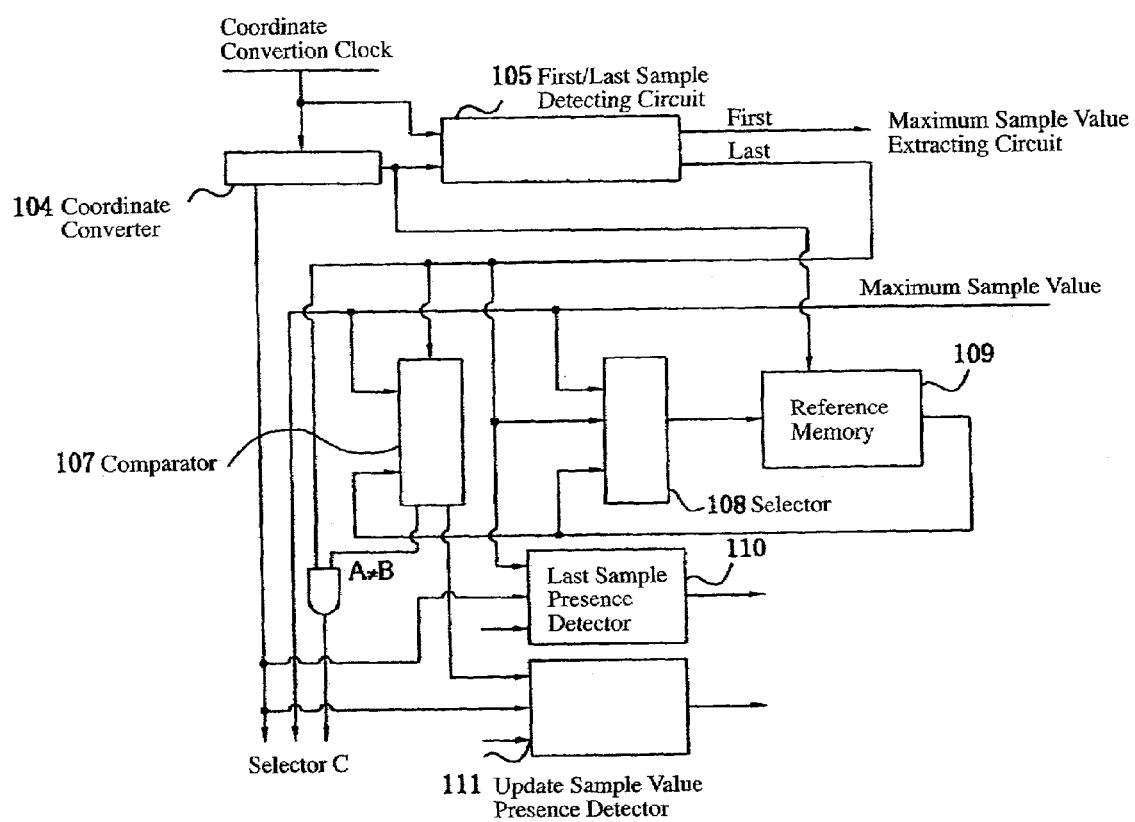
FIG. 12 is a block diagram showing the configuration of part of a detecting section of a radar according to a second embodiment of the invention.

Another configuration of a radar according to a second embodiment of the invention for producing detected image data is now described referring to FIG. 12.

FIG. 12 is a block diagram showing the configuration of part of a detecting section of the radar according to the second embodiment, in which designated by the numeral 104 is a coordinate converter, designated by the numeral 105 is a first/last sample detecting circuit, designated by the numeral 107 is a comparator, designated by the numeral 108 is a selector, and designated by the numeral 109 is a reference memory.

In this radar of the second embodiment employing the detecting section of FIG. 12, output data of the coordinate converter 104 is entered directly into the reference memory 109. The configuration of this radar is otherwise identical to that of the radar shown in FIG. 5. The reference memory 109 has a capacity to store image data for one antenna rotation.

In the configuration of FIG. 12, the coordinate converter 104 specifies storage locations corresponding to individual pixels in the reference memory 109 which stores the image data for one antenna rotation, and updates the data content of the reference memory 109 with the timing of the last sample point of each pixel. If no update sample value exists on a sweep line when the image data in the reference memory 109 is referred to, it is not necessary to transmit any data on the direction of the sweep line, or the relative antenna direction data, because the recipient display device 21 (24) just needs to re-present image data previously stored in itself for the same sweep line.

Figure 13:
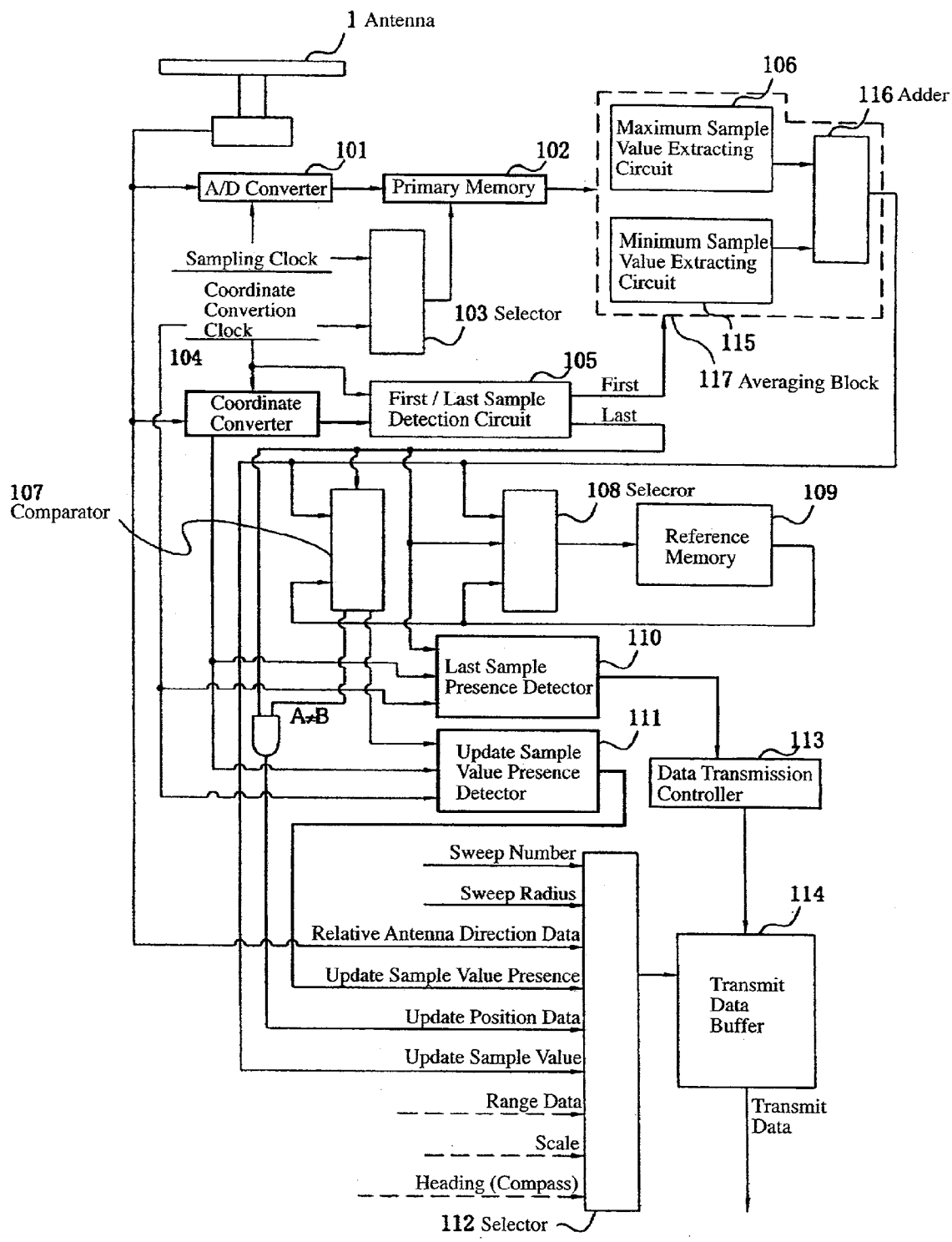
FIG. 13 is a block diagram showing the configuration of a detecting section of a radar according to a third embodiment of the invention.
Figure 14:
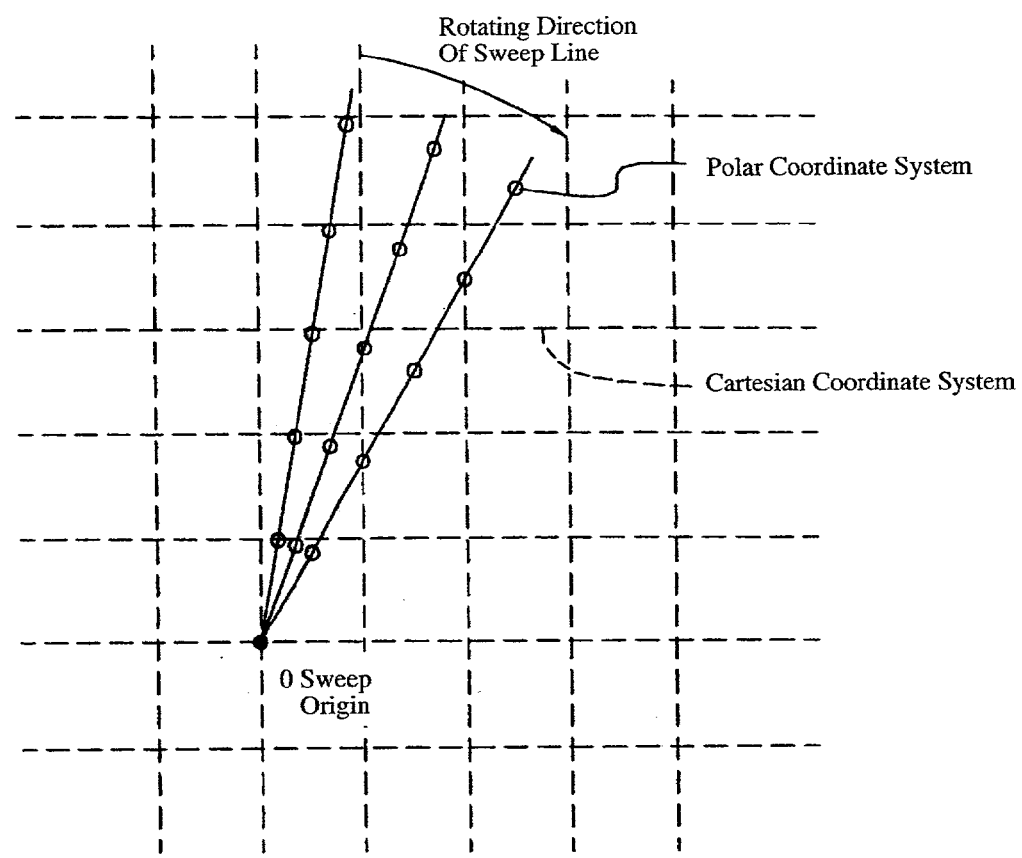
FIG. 14 is a diagram showing the relationship between original received signals formatted for a polar coordinate system and individual pixels arranged according to a Cartesian coordinate system.

Still another configuration of a radar according to a third embodiment of the invention for producing detected image data is now described referring to FIG. 13.

FIG. 13 is a block diagram showing the configuration of a detecting section of the radar according to the third embodiment, in which designated by the numeral 1 is an antenna, designated by the numeral 101 is an A/D converter, designated by the numeral 102 is a primary memory, designated by the numerals 103, 108, 112 are selectors, designated by the numeral 104 is a coordinate converter, designated by the numeral 105 is a first/last sample detecting circuit, designated by the numeral 106 is a maximum sample value extracting circuit provided with an extracted data memory, designated by the numeral 107 is a comparator, designated by the numeral 109 is a reference memory, designated by the numeral 110 is a last sample presence detector, designated by the numeral 111 is an update sample value presence detector, designated by the numeral 113 is a data transmission controller, designated by the numeral 114 is a transmit data buffer, designated by the numeral 115 is a minimum sample value extracting circuit, designated by the numeral 116 is an adder, and designated by the numeral 117 is an averaging block.

The radar shown in FIG. 13 is provided with the averaging block 117 including the adder 116 which calculates an average of sample values from maximum and minimum sample values detected for each pixel by the maximum sample value extracting circuit 106 and the minimum sample value extracting circuit 115.

The configuration of FIG. 13 makes it possible to obtain image data better representing multiple sample values of each pixel and to take in signal intensity data of the individual pixels with higher accuracy.

While the invention has thus far been described mainly with reference to the method of generating the detected image data of the radar, the same method can be applied to the sonar and the echo sounder which produce and transmit similar detected image data for raster-scan display on the display device 21 (24), as well as to the GPS receiver which produces and transmits positioning image data for raster-scan display.

The aforementioned method for reducing the amount of transmitted image data can also be used for the sonar, the echo sounder and the GPS receiver.

What is claimed is:

1. An onboard equipment network system comprising:
   at least one core device including a detecting section for detecting targets within a specific detecting range by transmitting and receiving detecting signals and generating detection data or a positioning section for fixing the position of a vehicle by receiving positioning signals from position-fixing satellites; and
   at least one display device including a display section for displaying the detection data or positioning data generated by said core device from the detecting signals received from the targets or from the positioning signals received from the satellites and a command section for setting operating conditions of said core device;
   wherein said core device and said display device are connected to each other by a network and said core device and said display device exchanges the detecting signals or the positioning signals in addition to command data through the network; and
   wherein said core device includes a control section for controlling communications and power supply through the network and a power supply section having a main power supply unit for feeding electric power to the detecting section or to the positioning section and a standby power supply unit for feeding electric power to the control section, and wherein the command data transmitted from said display device to said core device contains a power supply control command and said core device turns on and off the main power supply unit upon receipt of the power supply control command from said display device.

2. An onboard equipment network system comprising:
   at least one core device including a detecting section for detecting targets within a specific detecting range by transmitting and receiving detecting signals and generating detection data or a positioning section for fixing the position of a vehicle by receiving positioning signals from position-fixing satellites; and
   at least one display device including a display section for displaying the detection data or positioning data generated by said core device from the detecting signals received from the targets or from the positioning signals received from the satellites and a command section for setting operating conditions of said core device;
   wherein said core device and said display device are connected to each other by a network and said core device and said display device exchanges the detecting signals or the positioning signals in addition to command data through the network; and
   a control section for controlling communications and power supply through the network and a power supply section having a main power supply unit for feeding electric power to the detecting section or to the positioning section; and
   a standby power supply unit for feeding electric power to the control section; and
   wherein the control section turns on the main power supply unit when said core device receives operation command data from all the display devices indicating that they are in operation, and the control section turns off the main power supply unit when said core device does not receive the operation command data from all the display devices for a specified period of time.

3. An onboard equipment network system comprising:
   at least one core device including a detecting section for detecting targets within a specific detecting range by transmitting and receiving detecting signals and generating detection data or a positioning section for fixing the position of a vehicle by receiving positioning signals from position-fixing satellites; and
   at least one display device including a display section for displaying the detection data or positioning data generated by said core device from the detecting signals received from the targets or from the positioning signals received from the satellites and a command section for setting operating conditions of said core device;
   wherein said core device and said display device are connected to each other by a network and said core device and said display device exchanges the detecting signals or the positioning signals in addition to command data through the network; and
   a control section for controlling communications and power supply through the network; and
   a power supply section having a main power supply unit for feeding electric power to the detecting section or to the positioning section and a standby power supply unit for feeding electric power to the control section; and
   wherein the control section turns on the main power supply unit when said core device receives operation command data from at least one display device indicating that it is in operation, and the control section turns off the main power supply unit when said core device does not receive the operation command data from any of the display devices for a specific period of time.

4. An onboard equipment network system comprising:
   at least one core device including a detecting section for detecting targets within a specific detecting range by transmitting and receiving detecting signals and generating detection data or a positioning section for fixing the position of a vehicle by receiving positioning signals from position-fixing satellites; and at least one display device including a display section for displaying the detection data or positioning data generated by said core device from the detecting signals received from the targets or from the positioning signals received from the satellites and a command section for setting operating conditions of said core device;

wherein said core device and said display device are connected to each other by a network and said core device and said display device exchanges the detecting signals or the positioning signals in addition to command data through the network; and a control section for controlling communications and power supply through the network, the control section having a data transmitter for periodically transmitting data to the individual display devices; and a power supply section having a main power supply unit for feeding electric power to the detecting section or to the positioning section and a standby power supply unit for feeding electric power to the control section; and wherein the control section turns on the main power supply unit when a response signal is received from any of the display devices, and the control section turns off the main power supply unit when the response signal is not received for a specific period of time.

* * * * *